US006227559B1

(12) United States Patent
Slagerman et al.

(10) Patent No.: US 6,227,559 B1
(45) Date of Patent: May 8, 2001

(54) GROWABLE WHEELCHAIR

(75) Inventors: Murray G. Slagerman, Rosser (CA); Edward F. Freund, Denver, CO (US)

(73) Assignee: Sunrise Medical HHG Inc., Longmont, CO (US)

(*) Notice: Subject to any disclaimer, the term of this patent is extended or adjusted under 35 U.S.C. 154(b) by 0 days.

(21) Appl. No.: 09/479,537

(22) Filed: Jan. 7, 2000

Related U.S. Application Data

(63) Continuation-in-part of application No. 09/028,602, filed on Feb. 24, 1998, now abandoned.

(51) Int. Cl.[7] .......... B62B 1/00

(52) U.S. Cl. .......... 280/650; 280/250.1

(58) Field of Search .......... 280/650, 250.1, 280/304.1, 647, 649, 42; 297/DIG. 4

(56) References Cited

U.S. PATENT DOCUMENTS 4,082,348 * 4/1978 Haury .......... 297/45
5,328,183 * 7/1994 Counts .......... 280/42
5,915,709 * 6/1999 Radjenovic et al. .......... 280/250.1
6,050,582 * 4/2000 Horacek .......... 280/250.1

* cited by examiner

*Primary Examiner*—Kevin Hurley
*Assistant Examiner*—Andrew J. Fischer
(74) *Attorney, Agent, or Firm*—MacMillan, Sobanski & Todd, LLC

(57) ABSTRACT

A wheelchair has grow-tabs that permit the width of the wheelchair to be adjusted without affecting its height. The wheelchair has a side frame and a cross-brace member. The side frame has upper and lower side rails. The cross-brace member has upper and lower ends. An upper grow-tab is connected to the upper side rail. A link is connected between the upper grow-tab and the upper end of the cross-brace member. The upper grow-tab and the link are laterally adjustable relative to one another to vary the lateral space between the upper side rail and the cross-brace member without varying the height of the upper side rail. A lower grow-tab is connected to the lower side rail. The lower grow-tab is connected to the lower end of the cross-brace member. The lower grow-tab and the lower end of the cross-brace member are laterally adjustable relative to one another to vary the lateral space between the lower side rail and the cross-brace member without varying the height of the lower side rail.

17 Claims, 9 Drawing Sheets

GROWABLE WHEELCHAIR

CROSS-REFERENCE TO RELATED APPLICATIONS

This application is a continuation-in-part of U.S. patent application No. 09/028,602, filed on Feb. 24, 1998, now abandoned.

BACKGROUND OF THE INVENTION

1. Field of the Invention

The present invention relates generally to wheelchairs and, more particularly, to a wheelchair having grow-tabs which permit the width of the wheelchair to be varied without varying its height.

2. Description of the Prior Art

Wheelchairs are provided in various sizes to accommodate the physiology of various wheelchair occupants. Wheelchairs are generally manufactured in a variety of fixed sizes or custom made to a single fixed size. Such wheelchairs commonly have welded joints, which permanently affix various frame members together. Such wheelchairs are not readily adjustable and may require frequent replacement if the physiology of the wheelchair occupant changes.

Accordingly, some wheelchairs are adapted to accommodate physiological changes in the wheelchair occupant. For example, some wheelchair frames include interchangeable parts which permit the wheelchair to be widened, the seat to be lengthened or raised, and the seat back to be extended. Such a wheelchair is deficient in that it is often lacking in structural integrity. In addition, the interchangeable parts have little value in a secondary market. Moreover, rapid advances in technology lead to the eventual discontinuation in wheelchairs which further render interchangeable parts obsolete. Such parts result in economical and ecological waste.

Mounting cushions and pads on full-size wheelchair frames are viable alternatives to interchanging parts. However, some wheelchair occupants, typically children, tend to be much smaller than the wheelchair. This significantly affects the wheelchair occupant's ability to effectively use the wheelchair.

In addition to the foregoing deficiencies, wheelchairs often include parts which are specifically designed for the left side or the right side of the wheelchair. Parts for the left side are not interchangeable with the parts for the right side, and vice versa. This lack of interchangeability of parts results in an increase in manufacturing cost and complexity, and an increase in inventory requirements. In the case of interchangeable parts, separate inventories are necessary for parts for use on the left and right sides of the wheelchair.

Another deficiency remains with regard to the ability of portable wheelchairs to accommodate growth. Portable wheelchairs generally include frame which are foldable to permit the wheelchair to be easily transported. This enables the wheelchair occupant to conveniently travel to various locations. Portable wheelchairs commonly found in the prior art typically include opposing side frames having upper and lower side rails. The side frames are joined together by a cross-brace. The cross-brace includes a pair of members pivotally joined together to form an X-shaped configuration. Opposing ends of the cross-brace are pivotally mounted to the seat frame. Portable wheelchairs, like rigid wheelchairs, may also accommodate physiological changes in the wheelchair occupant. Such wheelchairs generally include a cross-brace which is adjustable to vary the width of the wheelchair. The adjustment typically includes a vertical component as well as a horizontal component. Hence, an adjustment in the width of the wheelchair results in a corresponding adjustment in its height. Accordingly, a second adjustment is often necessary to correct the height of the wheelchair.

What is needed is a wheelchair that overcomes the foregoing deficiencies. In particular, a wheelchair is needed which has grow-tabs that permit the width of a wheelchair to be easily adjusted without affecting its height.

SUMMARY OF THE INVENTION

The present invention is directed a wheelchair comprising a side frame and a cross-brace member. The side frame has an upper side rail and a lower side rail and the cross-brace member has an upper end and a lower end. An upper grow-tab is connected to the upper side rail and a link is pivotally connected between the upper grow-tab and the upper end of the cross-brace member. The upper grow-tab and the link are laterally adjustable relative to one another to vary the lateral space between the upper side rail and the cross-brace member without varying the height of the upper side rail. A lower grow-tab is connected to the lower side rail. The lower grow-tab is adapted to be pivotally connected to the lower end of the cross-brace member. The lower grow-tab and the lower end of the cross-brace member are laterally adjustable relative to one another to vary the lateral space between the lower side rail and the cross-brace member without varying the height of the lower side rail.

Various objects and advantages of this invention will become apparent to those skilled in the art from the following detailed description of the preferred embodiment, when read in light of the accompanying drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
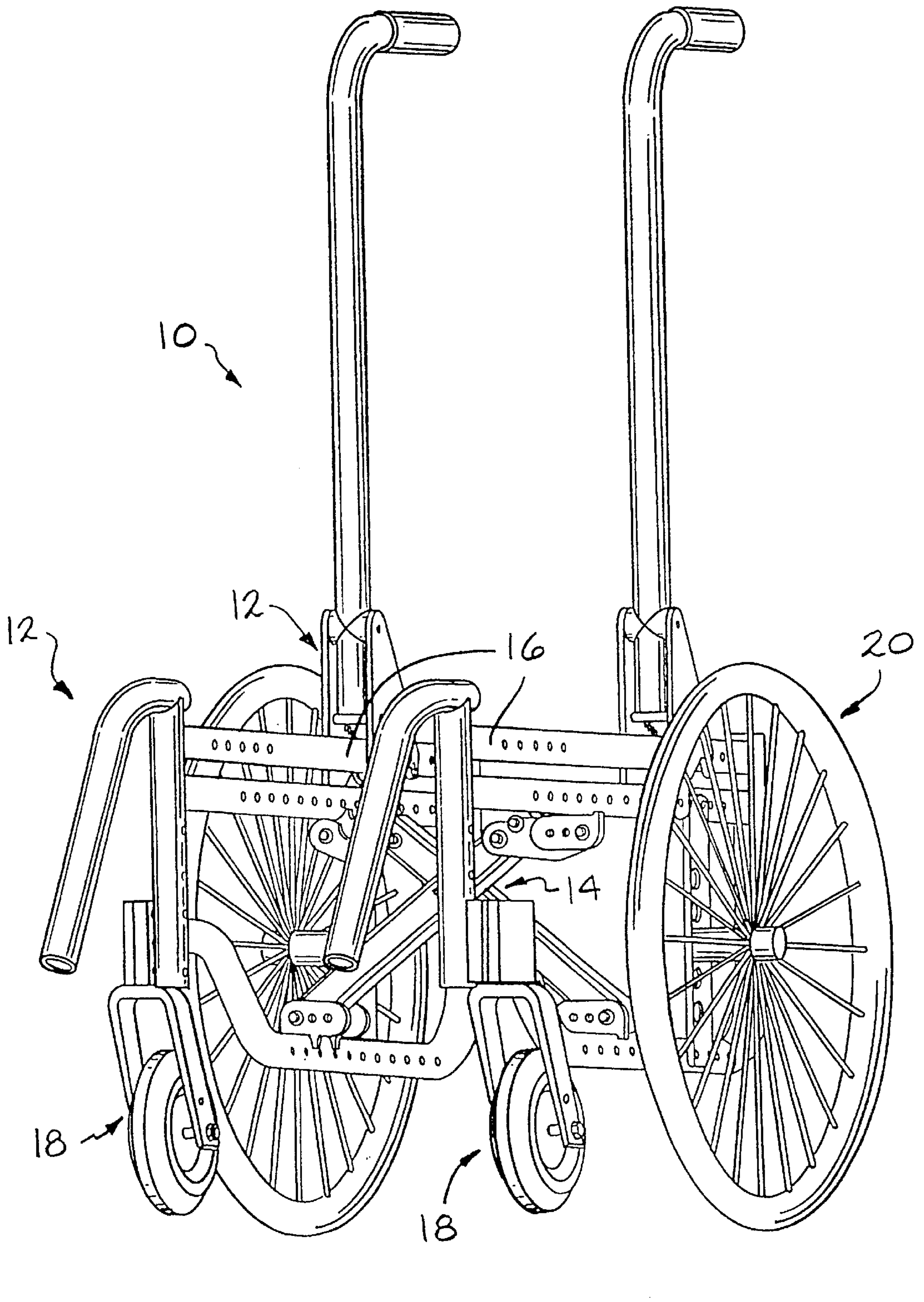
FIG. 1 is a front perspective view of a foldable wheelchair having a plurality of grow-tabs according to the invention.
Figure 2:
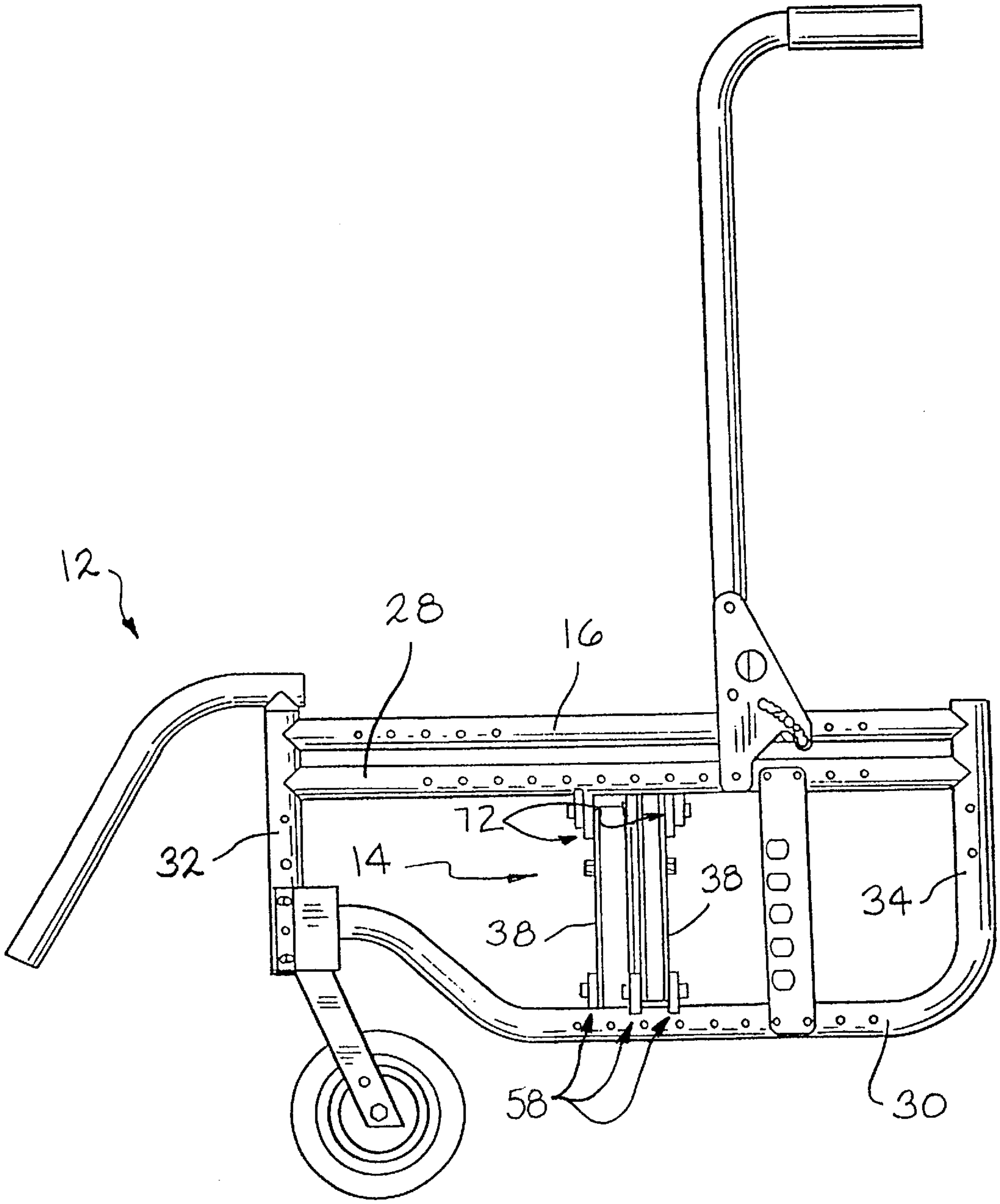
FIG. 2 is a partial side elevational view of the wheelchair shown in FIG. 1.

Referring now to the drawings, there is illustrated in FIGS. 1 and 2 a wheelchair 10 comprising a pair of laterally spaced side frames 12 interconnected by a cross-brace 14. Seat rails 16 may be integral with the side frames 12. A sling (not shown) may be supported by the seat rails 16. The length and height of the sling may vary. Footrests (not shown) may be mounted to the front end of each side frame 12 to support the wheelchair occupant's feet. Front and rear wheel 18, 20 support the side frames 12 on a supporting surface, such as the ground. As shown in FIG. 2, each side frame 12 includes an upper side rail 28 and a lower side rail 30. The front and rear ends of corresponding upper and lower side rails 28, 30 may be connected by front and rear substantially vertically extending tubes 32, 34.

Figure 3:
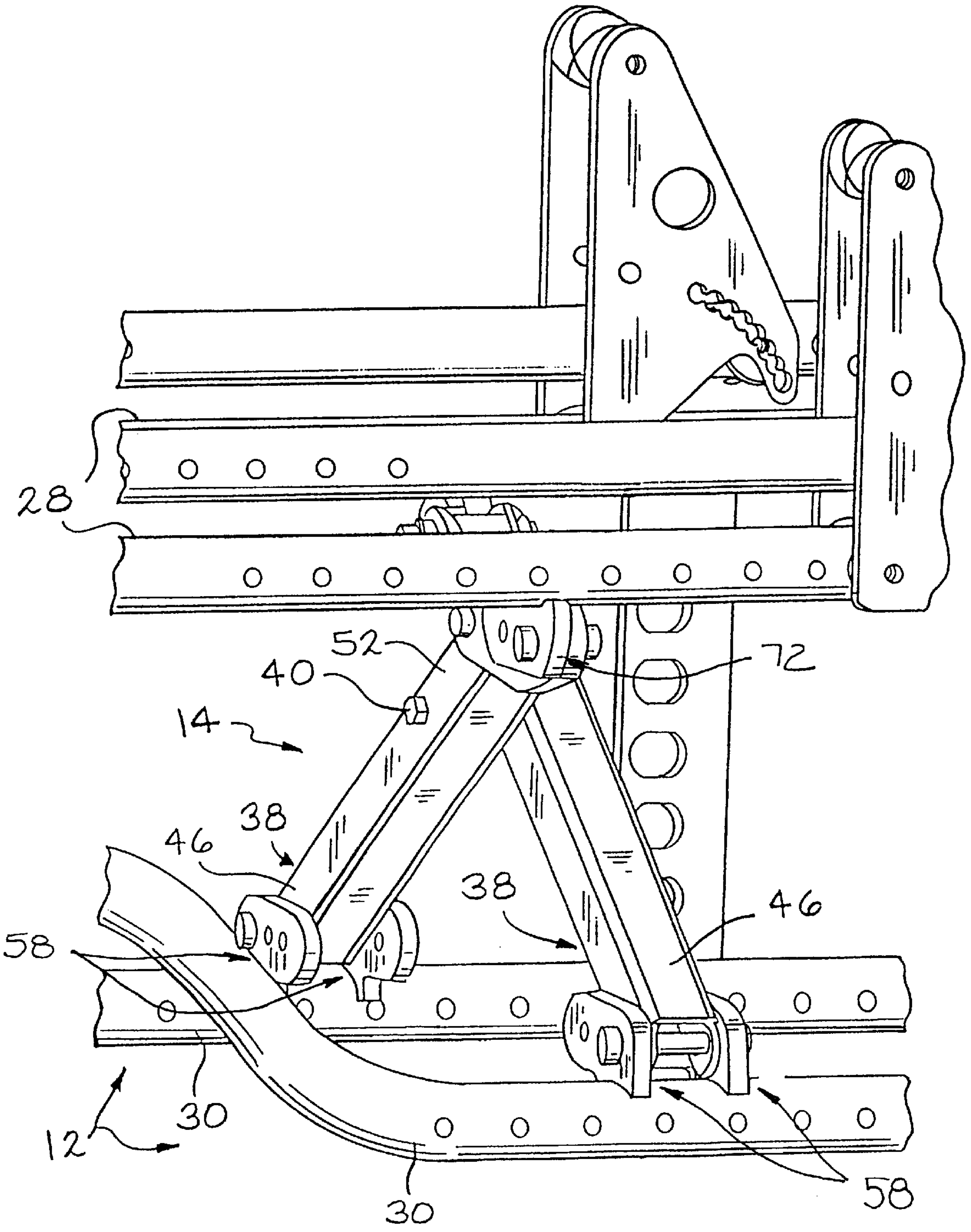
FIG. 3 is an enlarged partial side perspective view of the wheelchair side frames connected together with a cross-brace and a plurality of grow-tabs.

The cross-brace 14, as shown in FIG. 3, is a folding mechanism including two members, generally indicated at 38, connected by a pivot 40. The upper and lower ends 52, 46 of each cross-brace member 38 are connected to corresponding upper and lower side rails 28, 30 by corresponding upper and lower grow-tabs 72, 58.

Figure 4:
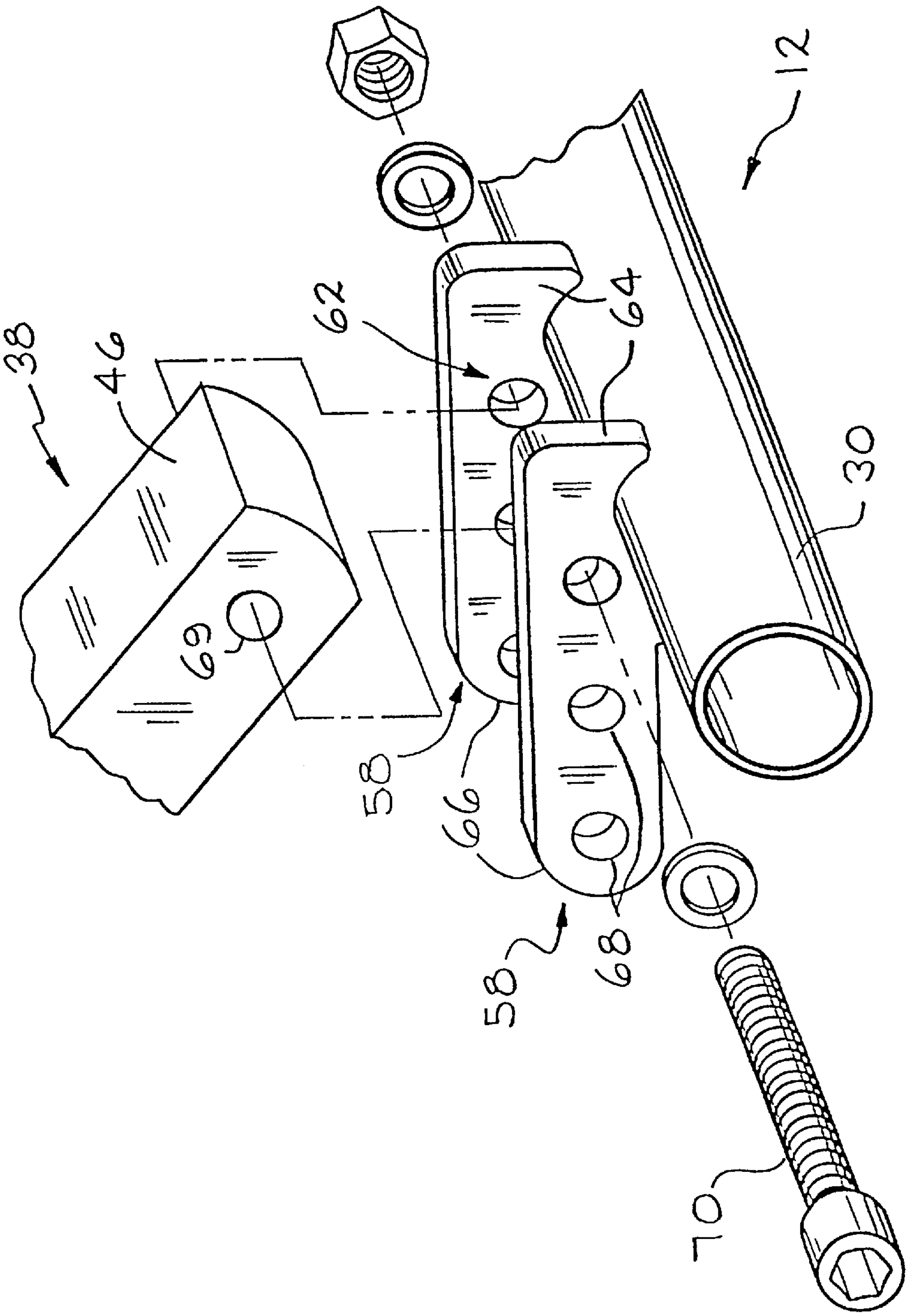
FIG. 4 is an enlarged exploded front perspective view of a pair of lower grow-tab.
Figure 6:
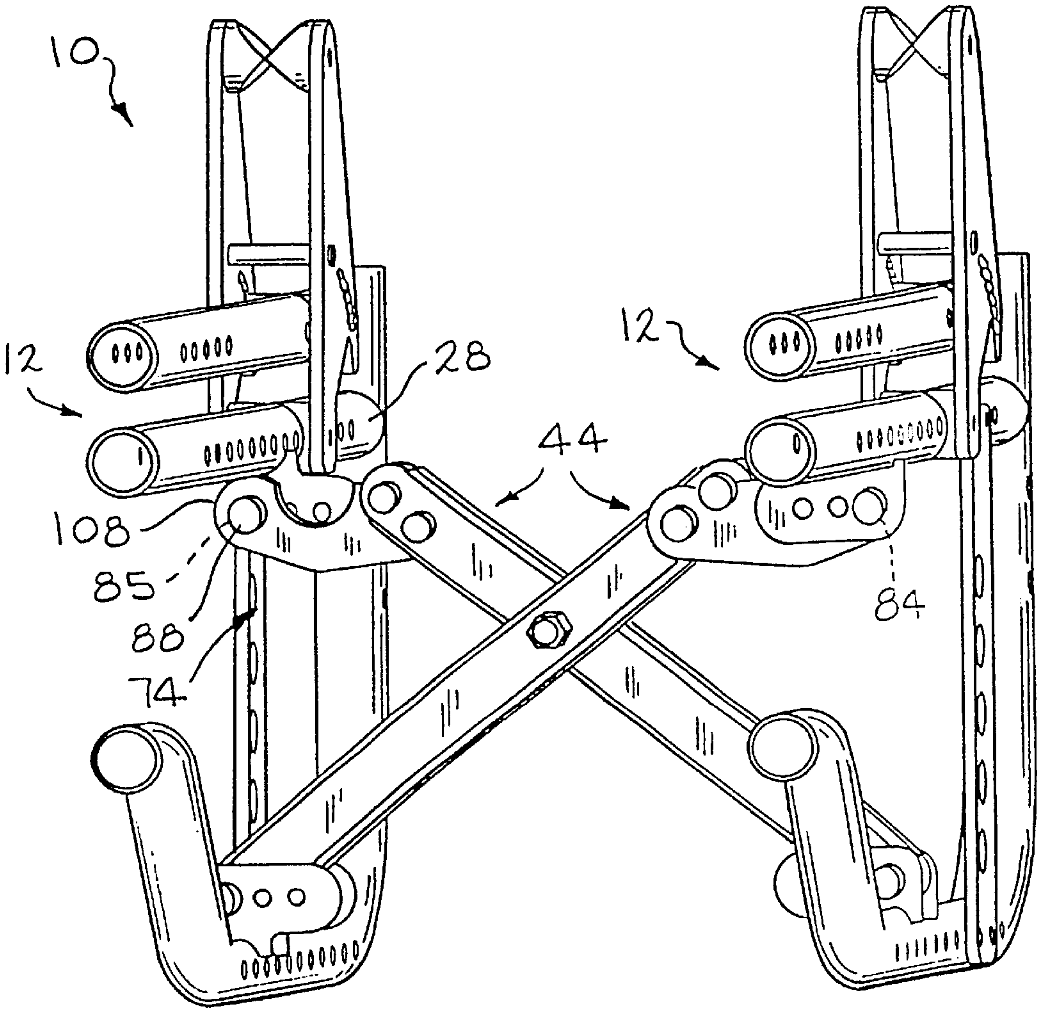
FIG. 6 is a sectional view in perspective of the wheelchair shown in FIG. 1 with the grow-tabs adjusted to minimize the spacing between the side frames.
Figure 7:
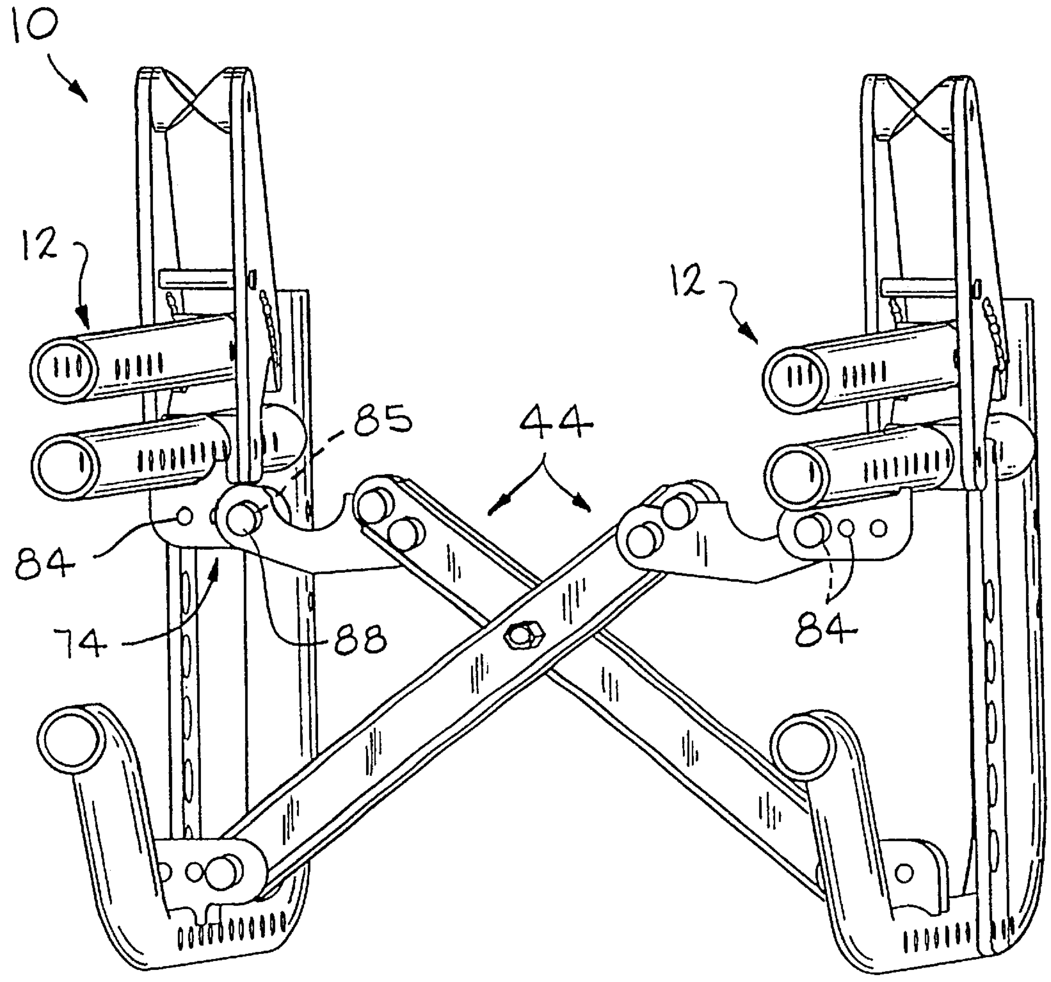
FIG. 7 is a sectional view in perspective of the wheelchair shown in FIG. 1 with the grow-tabs adjusted to maximize the spacing between the side frames.

A pair of lower grow-tabs 58 (FIG. 4) each has a first end 64 connected to a lower side rail 30. A plurality of laterally spaced apertures 68 extends to a second end 66 of each lower grow-tab 58. Although only three apertures are shown, any suitable number of apertures may be provided. The apertures 68 in the lower grow-tabs 58 are adapted to co-align. The lower grow-tabs 58 are longitudinally spaced to provide a channel 62 therebetween. The channel 62 is adapted to receive the lower end 46 of a cross-brace member 38. An aperture 69 provided in the lower end 46 of a cross-brace member 38 is adapted to co-align with one of the co-aligning apertures 68 in the lower grow-tabs 58. The co-aligning pair of apertures 68, 69 are adapted to receive a fastener 70 for pivotally connecting the lower end 46 of the cross-brace member 38 to the lower grow-tabs 58. The spacing between the lower side rails 30 may be varied by varying the position of the lower end 46 of each cross-brace member 38 relative to the lower grow-tabs 58, as shown in FIGS. 6 and 7. The tab apertures 68 may be uniformly spaced to permit the spacing between the lower side rails 30 to be uniformly and incrementally adjusted.

Figure 5:
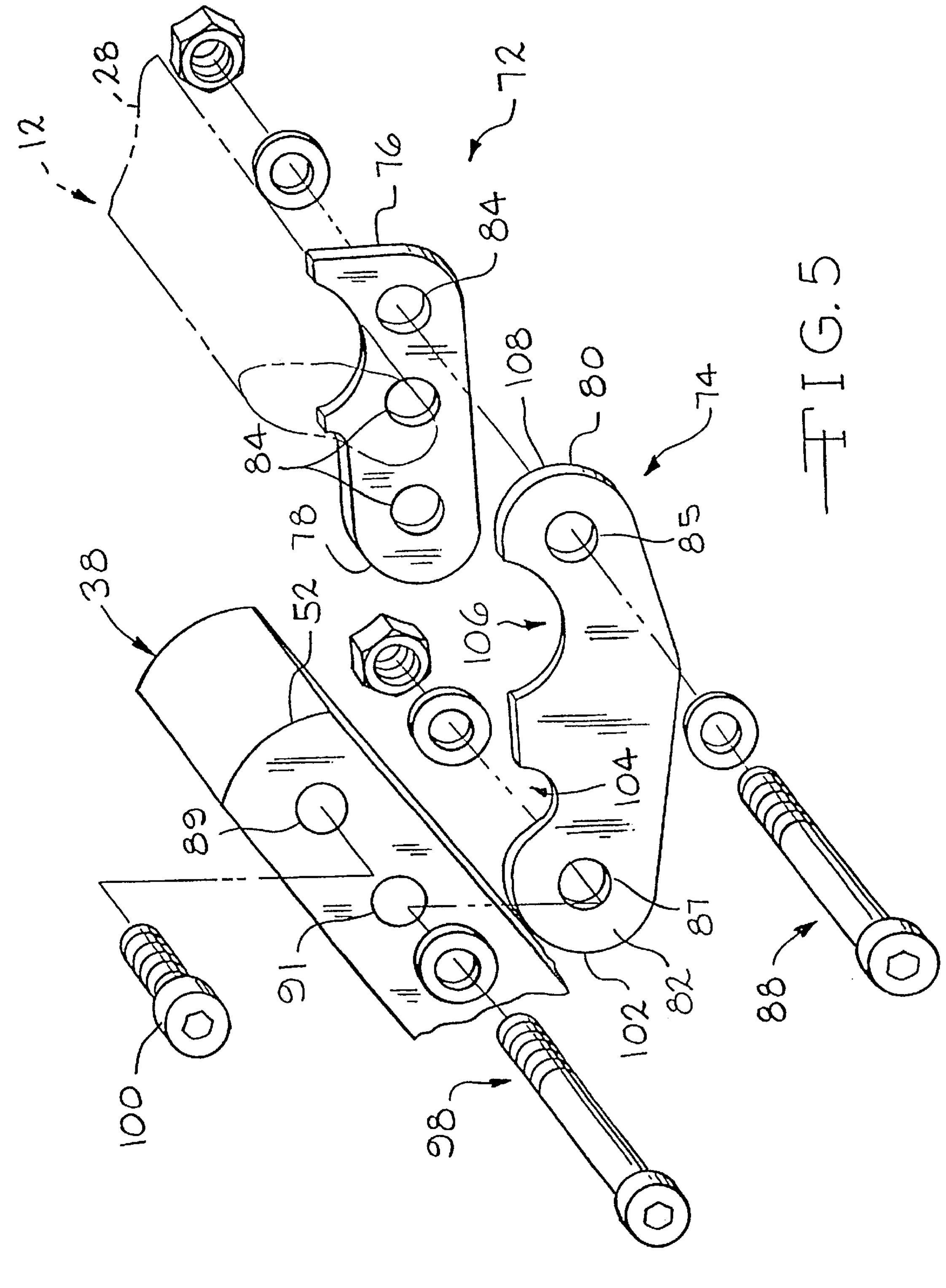
FIG. 5 is an enlarged exploded front perspective view of an upper grow-tab.

As shown in FIG. 5, a first end 76 of an upper grow-tab 72 is connected to an upper side rail 28 (shown in phantom line). A plurality of laterally spaced apertures 84 extends to a second end 78 of the upper grow-tab 72. Although only three apertures 84 are shown, any suitable number of apertures can be provided. Any one of the apertures 84 is adapted to co-align with an aperture 85 in a first end 80 of a link 74. The co-aligning apertures 84, 85 are adapted to receive a fastener 88 for pivotally connecting the first end 80 of the link 74 to the second end 78 of the upper grow-tab 72. The spacing between the upper side rails 28 to be varied by adjusting position of the link 74 relative to the upper grow-tab 72, as shown in FIGS. 6 and 7. The tab apertures 84 may be uniformly spaced to permit the spacing between the upper side rails 28 to be uniformly and incrementally adjusted.

A second end 82 of the link 74 is provided with an aperture 87. The upper end 52 of each cross-brace member 38 is provided with an upper aperture 89 and an intermediate aperture 91. The intermediate aperture 91 is adapted to be positioned to align with the aperture 87 in the second end 82 of the link 74. The co-aligning apertures 91, 87 are adapted to receive a fastener 98 for pivotally connecting the cross-brace members 38 to the second end 82 of the link 74.

A stop pin 100 extends through the upper aperture 89 in the upper end 52 of the cross-brace member 38. The stop pin 100 is adapted to engage the link 74 upon unfolding the wheelchair 10 to limit the travel of the cross-brace member 38. The second end 82 of the link 74 may be provided with a circumferential surface 102. The focal point of the radius of the circumferential surface 102 is defined by the focal point of the fastener 98 connecting the cross-brace members 38 to the link 74. Upon folding and unfolding the wheelchair 10, the stop pin 100 may travel along an arc about the circumferential surface 102. The stop pin 100 ceases to travel when it engages the link 74. The stop pin 100 is adapted to be received by a first relief 104 in an upper edge of the link 74 and near the second end 82 of the link 74. A portion of the first relief 104 is preferably tangential to a portion of the outer circumferential surface 102 of the link 74. Another portion of the first relief 104 defines an abutment surface. The stop pin 100 is adapted to engage the abutment surface.

Upon unfolding the wheelchair 10, the stop pin 100 travels along the arc about the circumferential surface 102 and into the first relief 104. The tangential portions of the first relief 104 and the circumferential surface 102 provide a smooth transition for the stop pin 100 to travel into and out of the first relief 104. Upon unfolding the wheelchair 10, the travel of the cross-brace member 38 is limited by the engagement of the stop pin 100 and the abutment surface, at which point the wheelchair 10 is completely unfolded. It should be understood that the present invention is not limited to the use of a stop pin 100. The travel of the cross-brace members 38 may be limited by any suitable stop member.

The upper edge of the link 74 further includes a second relief 106. The second relief 106 has a diameter suitable to receive the upper side rail 28. The second relief 106 is adapted to receive the upper side rail 28 upon folding the wheelchair 10. The relief permits the spacing between the side frames 12 to be minimized when the wheelchair 10 is folded.

It should be appreciated that the first end 80 of the link 74 may be provided with a circumferential surface 108. The circumferential surface 108 may have a radius the focal point of which is the center of the aperture 85 in the first end 80 of the link 74. The radius of the circumferential surface 108 is preferably at least slightly less than the distance between the focal point of the outermost aperture 84 in the upper grow-tab 72 and the upper side rail 28. In this way, sufficient clearance is provided between the circumferential surface 108 and the upper side rails 28 to enable the link 74 to pivot about the upper side rail 28.

The grow-tabs link assemblies 58, 72 may be staggered relative to one another, as is clearly shown in FIG. 2. For example, one of the upper grow-tabs 72 may be connected to an upper side rail 28 forward of the front cross-brace member 38 and the other upper grow-tab 72 may be connected to the opposing upper side rail 28 rearward of the rear cross-brace member 38. Similarly, one of the lower grow-tabs 58 may be connected to a lower side rail 30 forward of the front cross-brace member 38 and the other lower grow-tab 58 can be connected to the opposing lower side rail 30 rearward of the rear cross-brace member 38.

Figure 8:
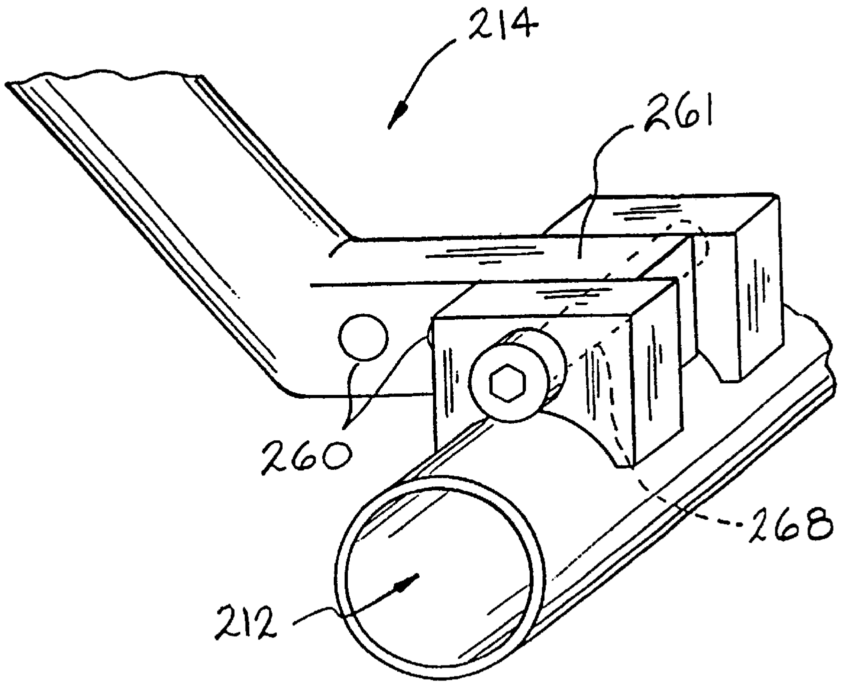
FIG. 8 is an enlarged front perspective view of an alternative lower grow-tab.
Figure 9:
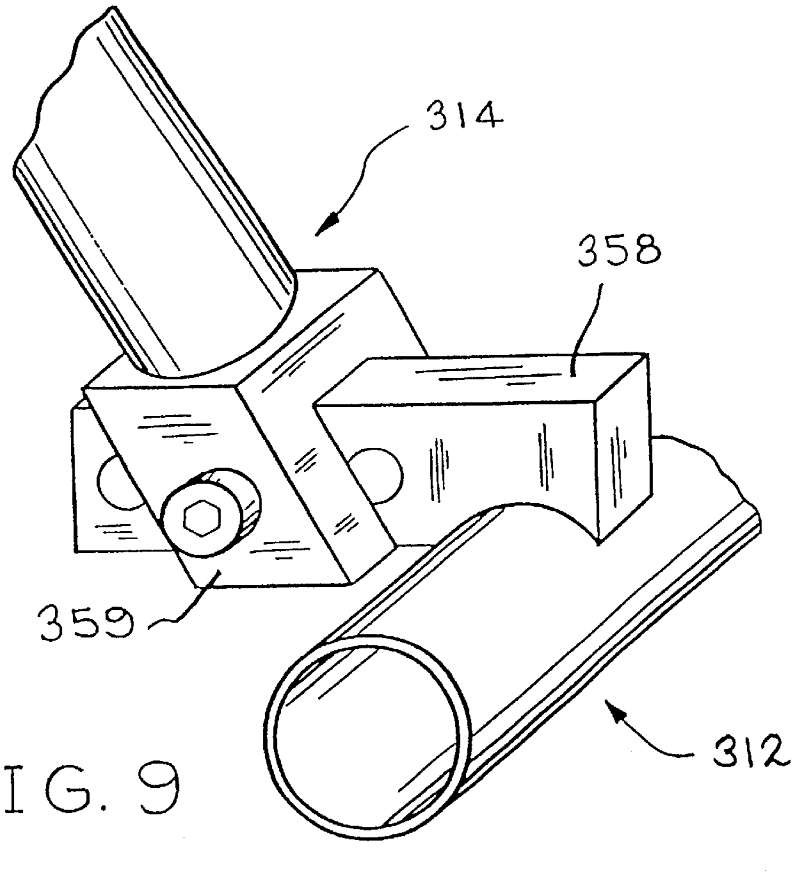
FIG. 9 is an enlarged front perspective view of another alternative lower grow-tab.
Figure 10:
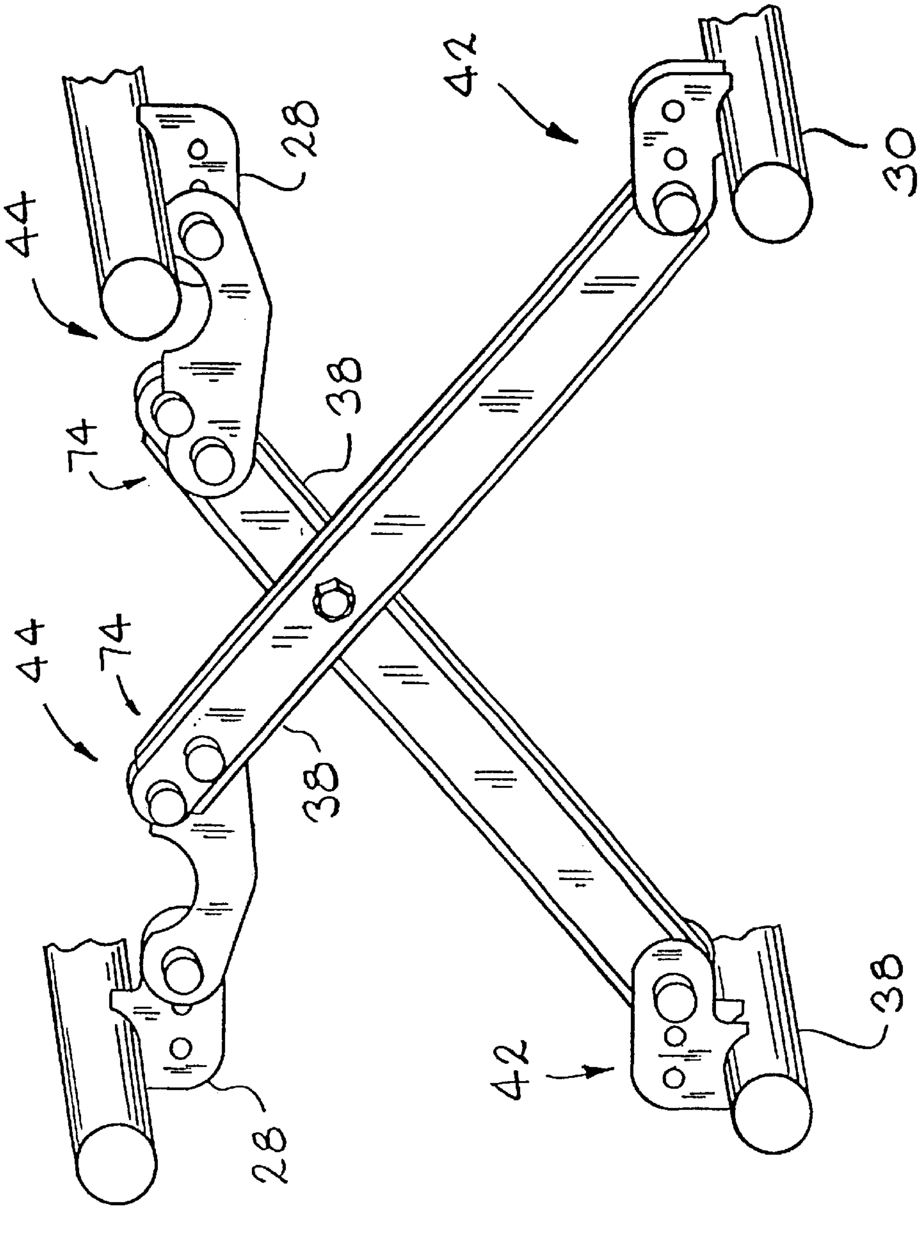
FIG. 10 is a front sectional view in elevation of an alternative folding wheelchair.

It should be understood that the invention is not intended to be limited to the specific embodiments described above. It is conceivable that other configurations may be suitable for carrying out the invention. For example, a grow-tab 261 may be integral with the cross-brace 214, as shown in FIG. 8. Moreover, a single grow-tab 358, such as shown in FIG. 9, may be substituted in the place the two longitudinally spaced grow-tabs 58. Further, the upper grow-tab member

72 may be provided with a single aperture 84 and the link 74 may be provided with a plurality of laterally spaced apertures 85 to accomplished the same lateral adjustment set forth above. Furthermore, the upper grow-tabs 72 shown may be suitable for connecting the lower ends 46 of the cross-braces 14 to lower side rails 30. Likewise, the lower grow-tabs 58 shown may be suitable for connecting the upper ends 52 of the cross-braces 14 to the upper side rails 28.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A wheelchair comprising:

a side frame having an upper side rail and a lower side rail;

a cross-brace member having an upper end and a lower end;

an upper grow-tab connected to said upper side rail and a link connected between said upper grow-tab and said upper end of said cross-brace member, said upper grow-tab and said link being laterally adjustable relative to one another to vary the lateral space between said upper side rail and said cross-brace member without varying the height of said upper side rail; and lower grow-tab connected to said lower side rail and adapted to be connected to said lower end of said cross-brace member, said lower grow-tab and said lower end of said cross-brace member being laterally adjustable relative to one another to vary the lateral space between said lower side rail and said cross-brace member without varying the height of said lower side rail.

2. A wheelchair according to claim 1, wherein lateral space between said cross-brace member and said side frame is varied by providing a plurality of laterally spaced apertures in each said grow-tab, any one of which is adapted to co-align with an aperture in a corresponding one of said link and said lower end of said cross-brace member, said co-aligning apertures being adapted to receive a fastener.

3. A wheelchair according to claim 1, further including a stop pin extending from said upper end of said cross-brace member and being adapted to engage said link to limit the travel of said cross-brace member.

4. A wheelchair according to claim 3, wherein said link comprises a relief having an abutment surface, said stop pin being adapted to engage said abutment surface.

5. A wheelchair according to claim 1, further including a seat rail integral with said side frame, said link comprises a relief which is adapted to receive said seat rail.

6. A wheelchair according to claim 5, wherein said seat rail is a tubular member and said relief has a shape complementary to said seat rail.

7. A wheelchair comprising:

a pair of laterally spaced side frames, each said side frame having an upper side rail and a lower side rail;

a cross-brace including two members connected together, each said cross-brace member having an upper end and a lower end;

a pair of upper grow-tabs, each said upper grow-tab being connected to a corresponding one of said upper side rails, each said upper grow-tabs further being connected to said upper end of a corresponding one of said cross-brace members by a link, said upper grow-tabs and said links being laterally adjustable relative to one another to vary the lateral spacing between said upper side rails without varying the height of said upper side rails; and a lower grow-tab interconnecting each said lower side rail to said lower end of a corresponding one of said cross-brace members, said lower grow-tabs and said lower ends of each said cross-brace members being laterally adjustable relative to one another to vary the lateral spacing between said lower side rails without varying the height of said lower side rails.

8. A wheelchair according to claim 7, wherein lateral space between said cross-brace members and said side frames is varied by providing a plurality of laterally spaced apertures in each said grow-tab, any one of said apertures being adapted to co-align with an aperture in a corresponding one of said upper links and said lower ends of said cross-brace members, said co-aligning apertures being adapted to receive a fastener.

9. A wheelchair according to claim 7, further including a stop pin extending from said upper end of each said cross-brace member and being adapted to engage said links to limit the travel of said cross-brace members.

10. A wheelchair according to claim 7, wherein said links each comprise a relief having an abutment surface, said stop pins being adapted to engage said abutment surfaces.

11. A wheelchair according to claim 7, further including a seat rail integral with each said side frame, each said link comprising a relief which is adapted to receive a corresponding one of said seat rails.

12. A wheelchair according to claim 11, wherein said seat rails are tubular members and said relief in each said link has a shape complementary to said seat rails.

13. A folding wheelchair comprising:

a pair of side frames each comprising an upper side rail and a lower side rail;

a pair of pivotally connected cross-brace members each having an upper end and a lower end;

a pair of upper grow-tabs each connected to a corresponding one of said upper side rails and pivotally connected to said upper end of a corresponding one of said cross-brace members by an upper link, said links being laterally displaceable relative to said upper grow-tabs to vary the lateral space between said upper side rails; and a pair of lower grow-tabs each connected to a corresponding one of said lower side rails and pivotally connected to said lower end of a corresponding one of said cross-brace members, said lower ends of said cross-brace members being laterally displaceable relative to said lower grow-tabs to vary the lateral space between said lower side rails.

14. A foldable wheelchair according to claim 13, wherein said upper and lower side rails are vertically spaced and fixed relative to each other.

15. A foldable wheelchair according to claim 13, further including a stop pin in said upper end of each said cross-brace member, each said stop pin being engageable with a corresponding one of said links to limit the pivotal travel of said cross-brace members.

16. A foldable wheelchair according to claim 13, wherein each said side frame further includes a seat rail, each said link further comprising a relief having a shape complementary to that of said seat rails, each said relief being adapted to receive a corresponding one of said seat rails.

17. A foldable wheelchair according to claim 16, wherein said seat rails are tubular.

* * * * *